United States Patent [19]
Huynh et al.

[11] Patent Number: 5,278,492
[45] Date of Patent: Jan. 11, 1994

[54] CONTROLLABLE AC POWER SUPPLY FOR AN OZONATOR

[75] Inventors: Anh N. Huynh, Cincinnati, Ohio; Phovios D. Ziogas, Brossard, Canada

[73] Assignee: Henkel Corporation, Ambler, Pa.

[21] Appl. No.: 821,112

[22] Filed: Jan. 15, 1992

[51] Int. Cl.$^5$ .................. B01J 19/08; 323 300; 323 320; 323 324; 323 326; 323 903

[52] U.S. Cl. .................. 323/326; 323/320; 323/903; 363/124; 422/186.16

[58] Field of Search ............ 363/27, 28, 95, 96, 363/97, 98, 124, 135; 422/186.15, 186.16

[56] References Cited

U.S. PATENT DOCUMENTS

| | | | |
|---|---|---|---|
| 3,577,708 | 5/1971 | Drenning | 323/903 |
| 3,643,405 | 2/1972 | Vukasovic et al. | 323/903 |
| 3,667,027 | 5/1972 | Martin | 363/134 |
| 3,772,853 | 11/1973 | Burge et al. | 323/903 |
| 3,873,282 | 3/1975 | Finch | 323/903 |
| 3,877,896 | 4/1975 | Muskovac | 323/903 |
| 4,002,921 | 1/1977 | Lowther | 363/129 |
| 4,027,169 | 5/1977 | Lowther | 363/135 |
| 4,048,668 | 9/1977 | Von Bargen et al. | 361/235 |
| 4,128,768 | 12/1978 | Yamamoto et al. | 250/535 |
| 4,191,993 | 3/1980 | Kratz et al. | 363/135 |
| 4,191,994 | 3/1980 | Kratz et al. | 363/135 |
| 4,351,020 | 9/1982 | Leti et al. | 363/97 |
| 4,390,831 | 6/1983 | Byrd et al. | 323/903 |
| 4,486,704 | 12/1984 | Gustafsson et al. | 323/903 |
| 4,680,694 | 7/1987 | Huynh et al. | 363/136 |
| 4,706,182 | 11/1987 | Masuda | 363/139 |
| 4,713,220 | 12/1987 | Huynh et al. | 422/186.16 |
| 4,752,866 | 6/1988 | Huynh et al. | 363/138 |
| 4,779,182 | 10/1988 | Mickal et al. | 363/37 |
| 4,833,583 | 5/1989 | Petitimbert | 363/36 |
| 4,860,149 | 8/1989 | Johnston | 323/903 |
| 4,922,401 | 5/1990 | Lipman | 363/58 |

FOREIGN PATENT DOCUMENTS

| | | | |
|---|---|---|---|
| 0448165 | 9/1991 | European Pat. Off. | H02M 7/521 |
| 623293 | 5/1981 | Switzerland | G05D 21/02 |

*Primary Examiner*—J. L. Sterrett
*Attorney, Agent, or Firm*—Ernest G. Szoke; Wayne C. Jaeschke; Kenneth Watov

[57] ABSTRACT

An ozonator power supply including a step-up transformer having one end of its primary winding connected to one side of an AC supply, its other end connected to the other side of the AC supply via a pair of switches connected in antiparallel, and a controller for providing switching pulses to said switches for making them conductive during variable portions of alternate half cycles of the AC voltage provided by said supply. An inductor is included in the circuit with the primary or secondary winding of the transformer that resonates with the capacitive impedance of an ozonator, for presenting a substantially non-reactive load to said AC supply.

12 Claims, 6 Drawing Sheets

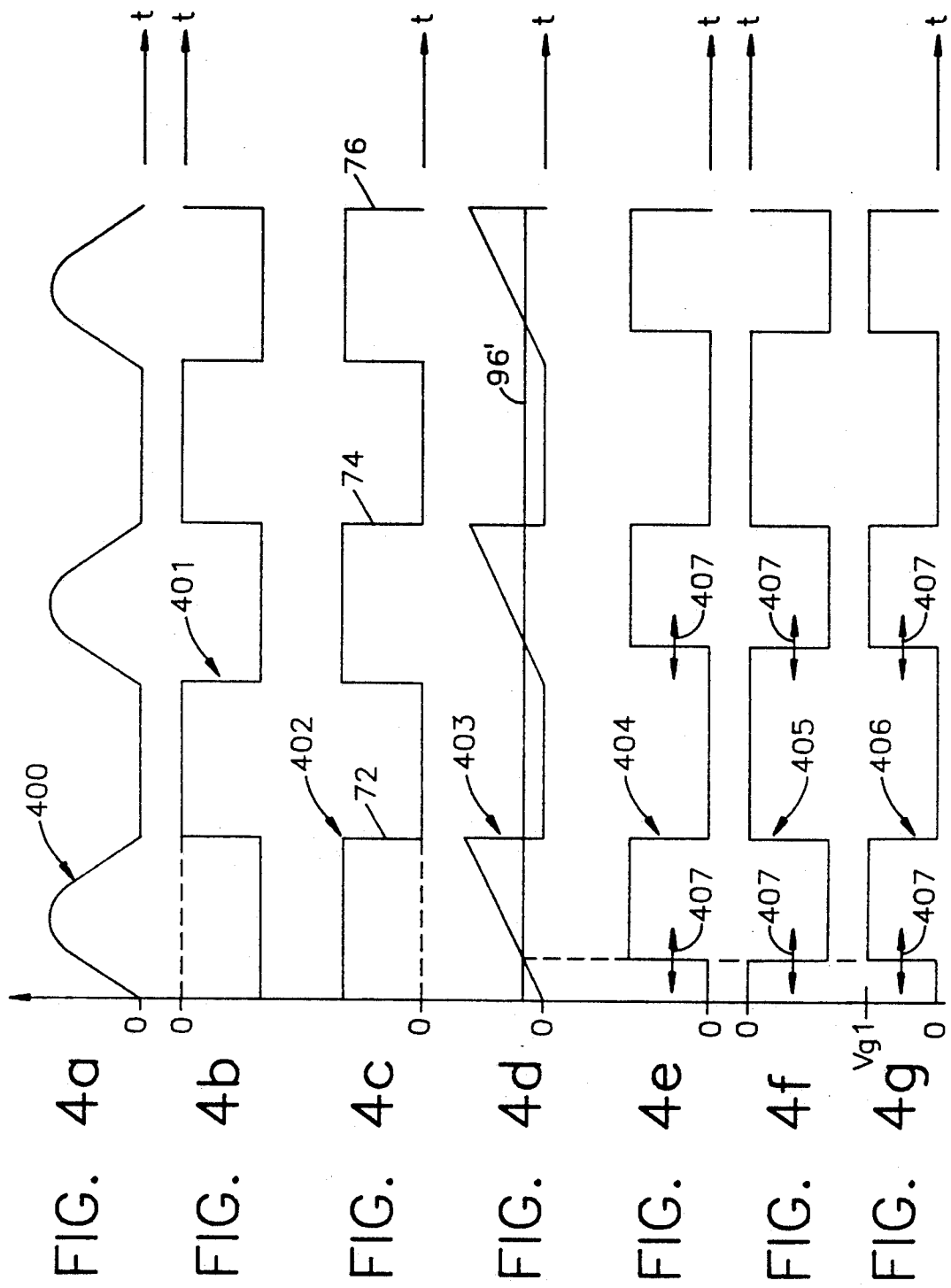

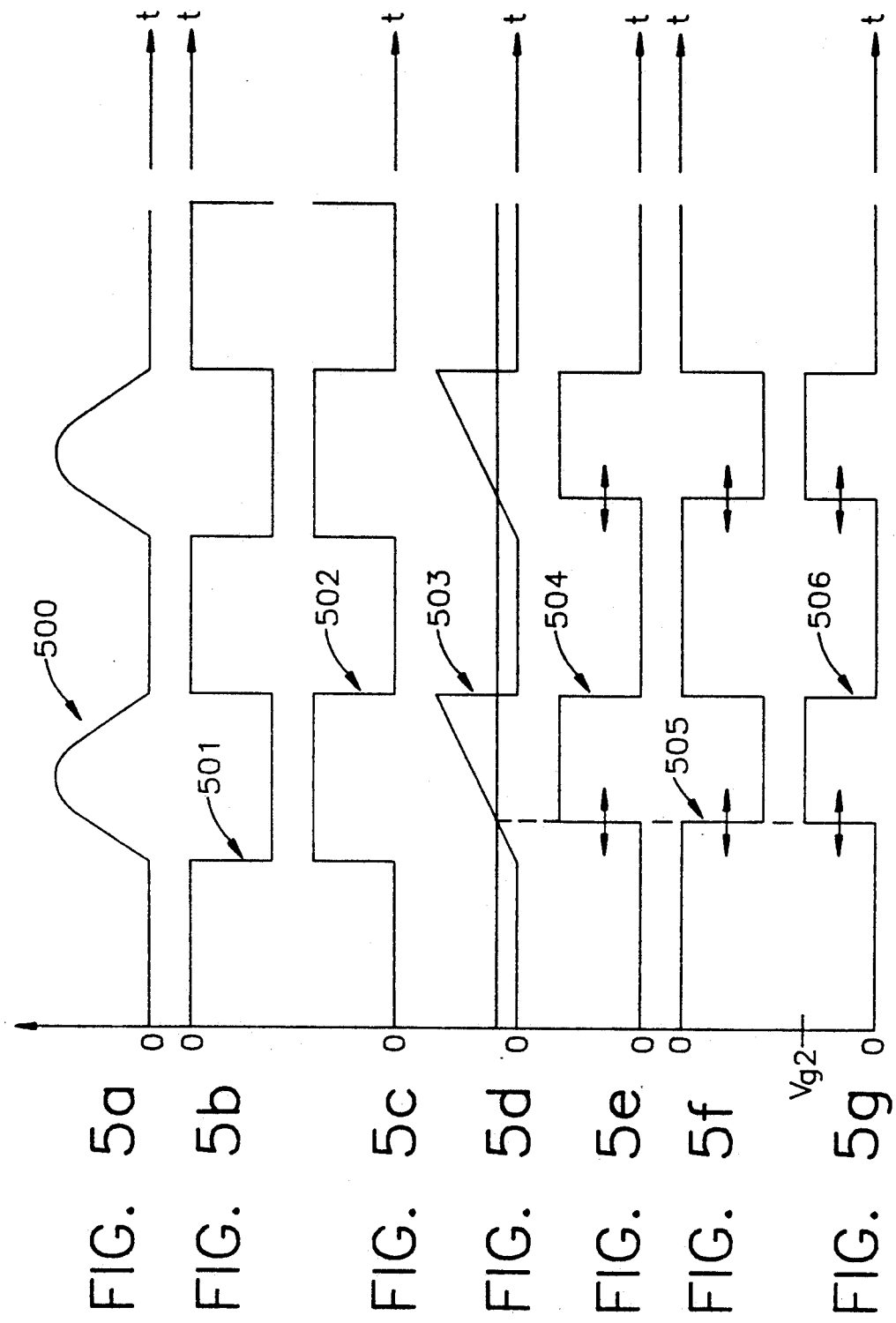

CONTROLLABLE AC POWER SUPPLY FOR AN OZONATOR

FIELD OF THE INVENTION

This invention relates generally to power supplies, and more particularly to solid-state power supplies that are particularly adapted for driving ozone generators.

BACKGROUND OF THE INVENTION

One of the most efficient ways for generating ozone, $O_3$, is to subject oxygen, $O_2$, or a gas containing a high concentration of oxygen to a corona discharge. Thus, for example, ozone may be generated by passing oxygen through an annular gap between a glass tube and a grounded outer electrode and applying a cyclic high voltage to an inner electrode embedded in the glass tube. Ozone is typically generated during portions of cycles occurring just prior to a peak. Therefore, more ozone can be produced by increasing the frequency of this cyclic voltage, but a point is reached when the power dissipated in the annular gap tends to break the ozone molecules $O_3$ down into oxygen molecules $O_2$.

Circuits for generating the drive voltage for ozonators have used auto transformers or saturable reactors, both of which are bulky, heavy and inefficient. Furthermore, it is desirable to be able to control the rate of production of ozone from 0% to 100% of the capacity of the ozone generator by controlling the drive voltage. This is impracticable to achieve with circuits using saturable reactors. In addition, an ozonator presents a capacitive load to the drive voltage supply so that the sizes of the step-up transformer and inductive control components of the supply are much larger than would be required if the power factor were unity.

In a U.S. patent application entitled "Power Supply" that was filed on Oct. 23, 1991 by the present inventors of this application, under Ser. No. 07/781,793, the drive voltage cycles supplied to the ozonator is asymmetric so that its slope during an increase in voltage to a maximum value was less than the slope during a decrease in voltage from the maximum value to zero. Since, as previously noted, ozone is produced while the drive voltage is increasing from some predetermined value to its maximum value, ozone is produced during a greater portion of each cycle than would be the case if the drive voltage half cycles were symmetrical. Control of the rate at which ozone is produced in this system is achieved by varying the duration of the lower slopes of the cycles. Operation at near unity power factor is achieved by including an inductor in the circuit that resonates with the capacitance of the ozonator at a frequency that is just below the frequency of the drive voltage so that the AC power supply uses an inductive load. The drive voltage cycles are generated by switching diagonal pairs of switches of a full bridge circuit.

A brief review of the teachings of prior references now follows. Invertor circuits for synthesizing an AC voltage waveform from a DC voltage are shown in U.S. Pat. Nos. 3,667,027; 4,002,921; 4,191,993; 4,191,994; and 4,922,401. Each one of these systems uses SCR or similar switching elements for developing the synthesized waveforms. Transformer coupling is used in a number of these known systems.

Huynh et al. U.S. Pat. No. 4,680,694 teaches a full-wave invertor using four thyristor switching elements $T_1$ through $T_4$. It is indicated that the thyristors are preferably provided by SCRs. Bilateral diodes are also connected in parallel across the thyristors.

Huynh et al. U.S. Pat. No. 4,752,866 teaches an ozonator power supply that includes a full wave rectifier for rectifying a three phase voltage, and a full wave bridge invertor using four thyristor switching elements for synthesizing the rectified voltage or DC into an AC waveform for application to the ozonator. A current pulse amplitude control circuit 43 for controlling the conduction of the pass transistor used to control the amplitude of the current pulses. A pulse width control logic and drive circuit 45 are used for controlling the operation of the thyristor switches $T_1$ through $T_4$ in a manner providing pulse width control.

Mickal et al. U.S. Pat. No. 4,779,182 teaches a three phase power supply circuit to supply power to an electrostatic filter. As shown in the figures, a three phase AC voltage is rectified by a full wave rectifier and applied to a full wave thyristor invertor circuit. Transformer coupling is used between the invertor and the electrostatic filter.

Masuda U.S. Pat. No. 4,706,182 teaches a radio frequency (RF) high-voltage power supply including a full wave rectifier 8 for rectifying a single phase AC voltage 7. The rectified voltage is applied across a power supply capacitor 6. The voltage developed across the capacitor 6 is applied between the center tap of the primary winding of a transformer 1 and ground. SCR's $S_1$ and $S_2$ are connected with their main current paths in opposite polarity relative to one another to the upper and lower connections to the primary winding, respectively. Inductors $L_1$ and $L_2$ provide the coupling between the SCR's and the primary winding, respectively. Inverse current diodes are connected in parallel with the main current paths of each one of the SCR's. Conduction of the SCR's $S_1$ and $S_2$ are controlled for providing an RF output voltage across the secondary winding 2 of the transformer 1.

Petitimbert U.S. Pat. No. 4,833,583 shows a power supply for processing three phase AC to provide voltage to an ozonizer. For each phase of the three phase AC, a pair of SCR's are connected in parallel with a respective transformer winding.

Von Bargen et al. U.S. Pat. No. 4,048,668 teaches a power supply for driving a high voltage ozonator. The power supply full wave rectifies a single phase AC voltage, which is then chopped via invertor circuits into a high frequency synthesized AC output voltage for driving an ozonator.

Lowther U.S. Pat. No. 4,027,169 teaches a high voltage power supply for driving a corona generator. The power supply includes a pair of SCR's connected in series with the primary winding of a main transformer 38. The gate electrodes of the SCR's are connected across primary windings of a controlled transformer 37.

BRIEF SUMMARY OF THE INVENTION

In accordance with this invention, one end of the primary winding of a step-up transformer is connected to one side of a source of alternating current voltage (AC) and the other end is coupled to the other side of the source via a pair of unidirectional switches connected in anti-parallel. The secondary of the transformer is coupled to an ozonator load. Triggering means are provided for enabling one switch to conduct during a portion of each positive half cycle of the AC voltage, and the other switch to conduct during a like portion of each negative half cycle. Conduction through the primary winding of the transformer during the portions of each half cycle referred to are such as to produce a sawtooth shaped voltage across the capacitive ozonator load. The sawtooth voltage has a slow rise time and fast fall time. Variations in the durations of the portions of the intervals during which the slowly rising voltages produce a corona discharge varies the amount of ozone that is produced. An inductor is inserted in either the primary or secondary winding circuit of the transformer for resonating with the capacitive impedance of the ozonator lead at a frequency below the switching frequency so as to both present an inductive load to the AC voltage supply, and prevent damage to the switches.

BRIEF DESCRIPTION OF THE DRAWINGS

The various embodiments of the invention are described below with reference to the accompanying drawings, in which like items are indicated by the same reference designation, wherein:

FIGS. 4a through 4g are voltage waveforms appearing at various points in the portion of the control circuit of FIG. 3 that are used in explaining how it generates pulses for controlling one switch of the embodiment of FIG. 1; and FIGS. 5a through 5g are voltage waveforms appearing at various points in the portion of the circuit of FIG. 3 that generates pulses for controlling the other switch of the embodiment of FIG. 1.

DETAILED DESCRIPTION OF THE INVENTION

Figure 1:
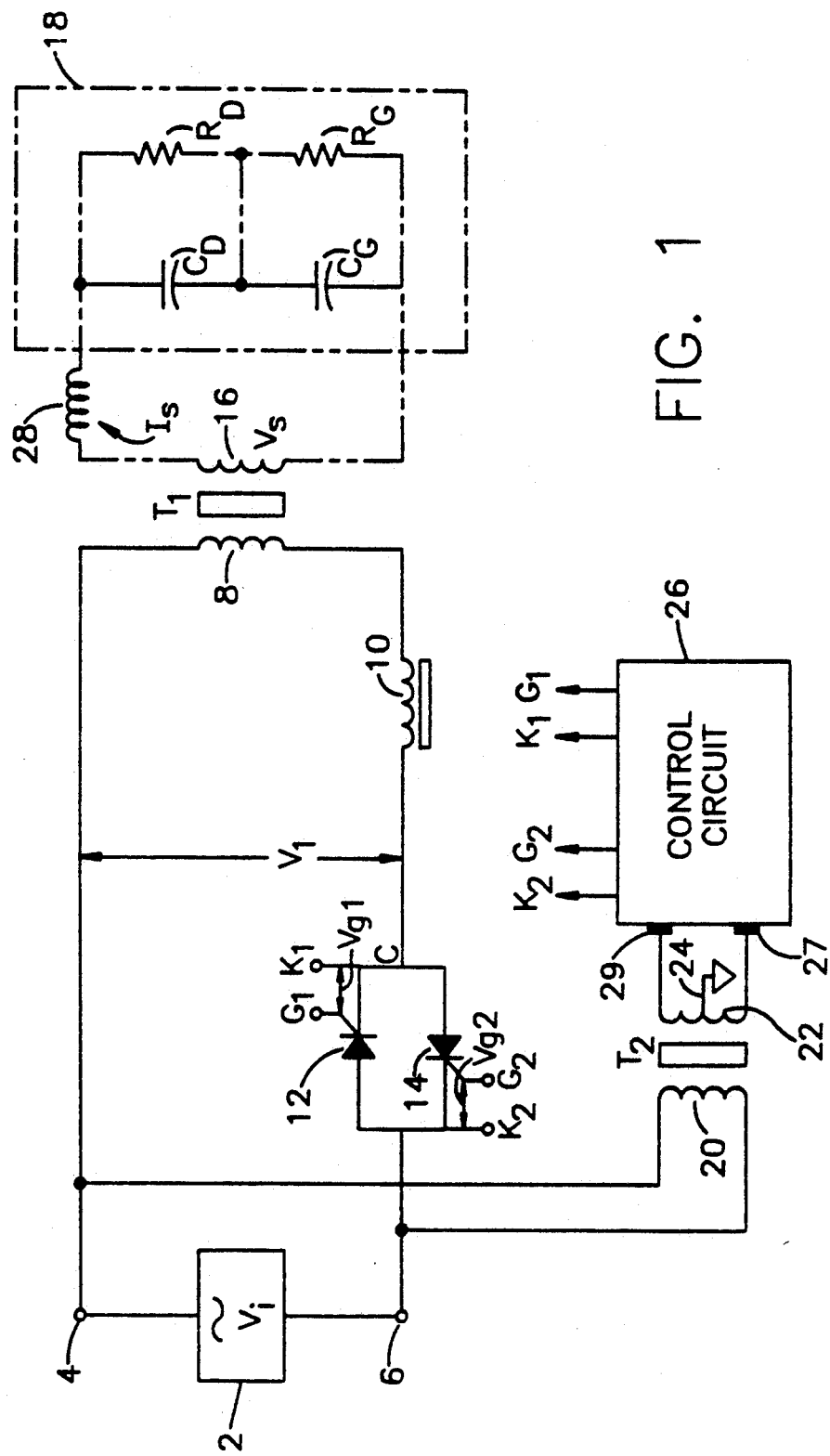
FIG. 1 is a circuit schematic diagram of an ozonator power supply of one embodiment of this invention.

In the ozonator power supply shown in FIG. 1, a source 2 of alternating current voltage (AC) is connected between terminals 4 and 6, and one end of the primary winding 8 of a voltage step-up transformer $T_1$, is connected to the terminal 4. The other end of the primary winding 8 is connected via an inductor 10 in series with switches 12 and 14 (herein shown as thyristors, that are connected in anti-parallel) to the terminal 6. The secondary winding 16 of the transformer $T_1$, is coupled to an ozone generating means 18. A schematic diagram of an equivalent circuit of ozone generating means 18, as shown, includes $C_D$ and $R_D$ respectively representing the capacitance and resistance of a glass tube of an ozonator, and $C_G$ and $R_G$ respectively representing the capacitance and resistance of an air gap between the glass tube and a grounded outer conductor.

The terminals 4 and 6 are also respectively connected to opposite ends of the primary winding 20 of a transformer $T_2$. The secondary winding 22 of transformer $T_2$ is grounded at its center tap 24, and is coupled to a control circuit 26. The end of the secondary winding 22 that has the same polarity as the input terminal 6 is connected to an input terminal 27 of the control circuit 26, and the other end of the secondary winding 22, which has the same polarity as the terminal 4, is connected to an input terminal 29. The control circuit 26 respectively supplies switching pulses $V_{g1}$ and $V_{g2}$ between the cathodes and gates of switches 12 and 14, respectively, so as to make them conductive during controlled portions of subsequent half cycles of the AC voltage supplied by the source 2. The manner in which the switching pulses are derived will be explained in connection with FIG. 3.

The value of the inductor 10 is such as to resonate with the capacitance of the ozonator 18 at the frequency just below that of the AC waves from the source 2. The value $L_{10}$ of the inductance 10 that produces resonance can be determined from the following equation:

$$L_{10} = (25.33) \, [(C_D + C_G)/C_D C_G] \, [n_p/n_s]^2 \, [1/f^2] \text{ millihenry} \qquad 1)$$

In this equation, $n_p$ represents the number of turns in the primary winding 8, $n_s$ represents the number of turns in the secondary winding 16, and f is the frequency of the AC voltage from the source 2. In practice, the value of $(C_D + C_G)/C_D C_G$ becomes $C_D$ when the ozonator power reaches its maximum value so that the value of the inductance $L_{10}$ of the inductor 10 that produces resonance may be expressed by the following equation:

$$L_{10} = (25.33) \, [n_p/n_s]^2 \, [1/C_D f^2] \text{ millihenry} \qquad (2)$$

Alternatively, the inductance for producing near resonance can be provided by an inductor 28, shown as dashed lines, that is included in the circuit of the secondary winding 16 of transformer $T_1$. Its inductance will not be the same as the inductance of the inductor 10 because the turns ratio $n_p/n_s$ can be ignored.

Figure 2A:
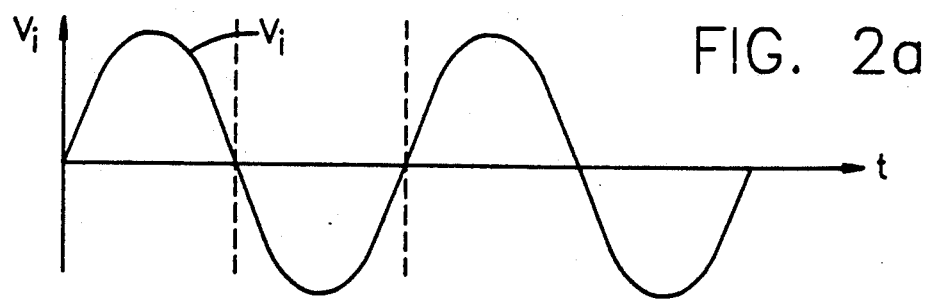
FIGS. 2a through 2f are waveforms of voltages or currents at respective points in the circuit of FIG. 1, that are used in explaining its operation.
Figure 2B:
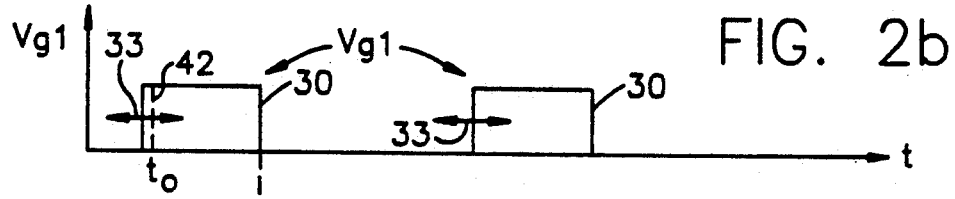
Figure 2C:
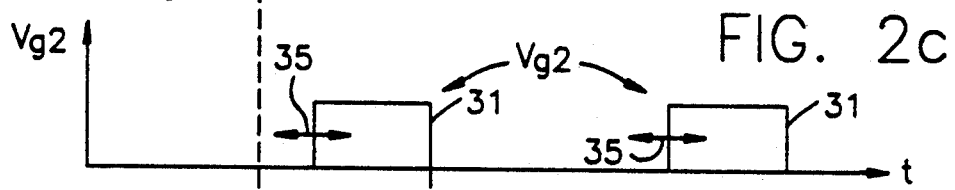
Figure 2D:
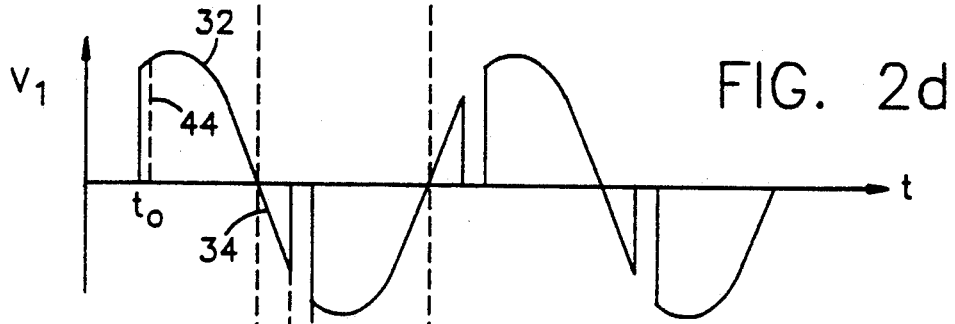

Operation of the embodiment of ozonator power supply of this invention that is shown in FIG. 1 will now be explained by reference to the waveforms of FIGS. 2a through 2f of FIG. 2. The waveforms have the same time axis. FIG. 2a shows the AC voltage $V_i$ that is provided between the terminals 4 and 6 by the voltage source 2. FIG. 2b shows the square waves or switching pulses $V_{G1}$ for triggering thyristor 12 into conduction, and FIG. 2c shows square waves or switching pulses $V_{G2}$ for triggering thyristor 14 into conduction. FIG. 2d shows the voltage $V_1$ that is produced across the series combination of the inductor 10 and the primary winding 8 of the transformer $T_1$.

When no current is flowing in the primary winding 8, the voltage $V_1$ will necessarily be zero. At the beginning, i.e. prior to the time $t_0$, neither of the thyristors 12 or 14 are biased or triggered for conduction so that $V_1$ is zero, but when thyristor 12 is biased or triggered into conduction by a $V_{G1}$ switching or trigger pulse 30, $V_1$ equals $V_i$ as indicated by waveform 32 of FIG. 2d. Between T/2 (i.e., one-half of the period T of the AC voltage from the source 2) and $t_2$, neither thyristor 12 nor 14 is biased or triggered for conduction, but thyristor 12 remains in a conductive state while current is made to flow through it between T/2 and $t_1$ as indicated at 34 by virtue of the fact that the primary circuit is inductive.

Figure 2E:
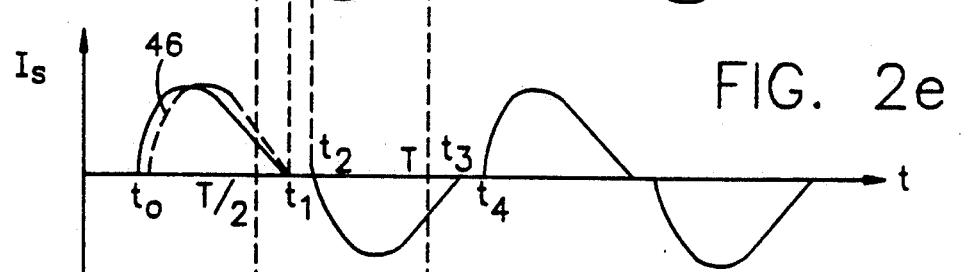
Figure 2F:
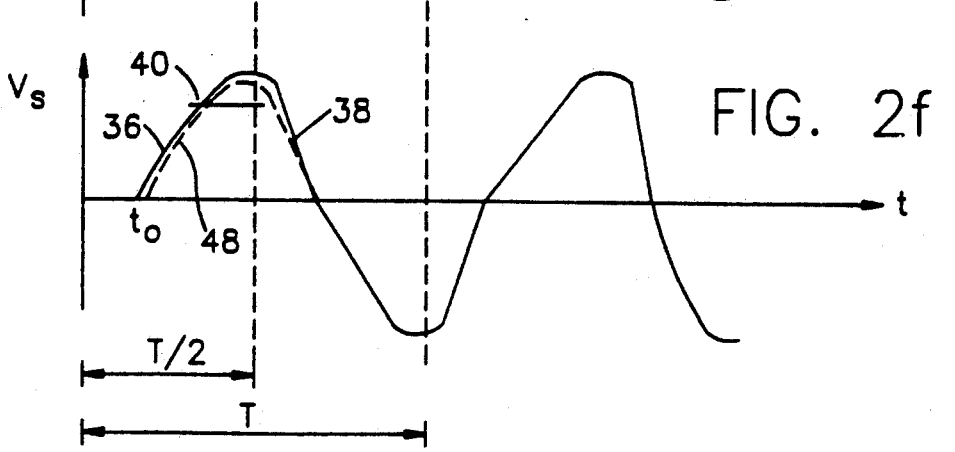

With a voltage such as indicated at the waveform sections 32 and 34 of $V_1$ applied across the series connection of inductor 10 and the primary winding 8, a current $I_s$, such as indicated in FIG. 2e, flows through the secondary winding 16. The current $I_s$ charges the capacitances represented by the capacitors $C_D$ and $C_G$ so as to produce a rising voltage indicated at 36 of the secondary output voltage $V_s$ of FIG. 2f. At $t_1$, when $V_1$ becomes zero, the capacitances $C_D$ and $C_G$ discharge so that the voltage across them falls as indicated at waveform portion 38 of $V_s$. Corona discharge takes place during the last portion of the rising voltage waveform portion 36, e.g. above a line 40. Note that because of the low slope of the waveform section 36, the corona discharge occurs for a longer time than would be the case if the waveform sections 36 of $V_s$ had the same slope as waveform section 38, i.e. a greater slope.

The operation during a negative half cycle of $V_i$, when thyristor 14 conducts is similar to the operation just described for a positive half cycle of $V_i$. For example, at $t_1$, $I_s$ goes to zero and thyristor 12 turns off. Between $t_1$ and $t_2$, both thyristor 12 and 14 are turned off, and $V_1$ is at zero volts. At $t_2$, trigger pulse 31 of $V_{g2}$ triggers thyristor 14 into conduction causing $V_1$ to be applied across primary winding 8 and $I_s$ to flow negatively or in an opposite direction through secondary winding 16. Corona discharge occurs during the increasing negative voltage transition of $V_s$. At $t_3$, $I_s$ goes to zero, and thyristor 14 turns off. At $t_4$, a positive half-cycle of operation is repeated to begin another cycle of operation in a repetitive manner.

Control of the rate at which ozone is produced is attained by varying the timing of the leading edges of the pulses $V_{G1}$ and $V_{G2}$ of FIGS. 2b and 2c as indicated by the arrows 33 and 35. By way of example, assume that the width of the pulse 30 of $V_{G1}$ of FIG. 2b is reduced by advancing its leading edge as indicated by a dashed line 42. The effect of this on $V_1$ is indicated by a dashed line 44 in FIG. 2d, and the effect on the secondary current $I_s$ is indicated by a dashed line 46 in FIG. 2e. The voltage $V_s$ of FIG. 2f, across the ozonator 18 follows a dashed line 48 that is seen to cross the line 40 at a later time than $t_0$, so that corona discharge takes place during a shorter time interval between the crossing of the line 40 and the peak of the positive going portion of $V_s$, in this example. If the width of the switching pulse 30 were increased, the voltage $V_s$ would be above the line 40 for a longer interval so that more ozone would be produced. The same type of operation occurs when the width of the switching pulses $V_{G2}$ is varied, but it is not shown in that the positive and negative half-cycles are "mirror images" of the other.

Figure 3A:
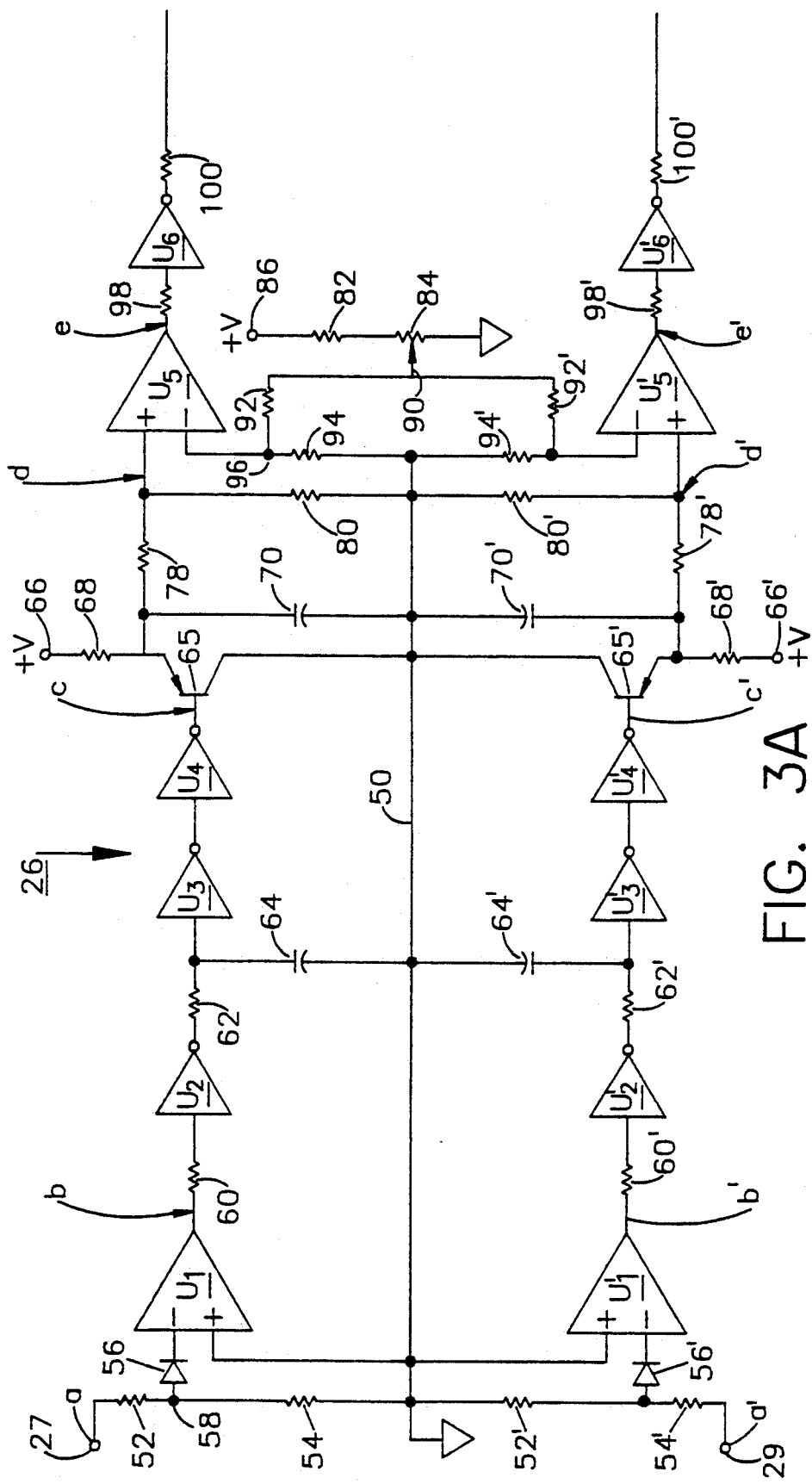
FIGS. 3A and 3B are schematic diagram, of a circuit of an embodiment of this invention for controlling the switches.
Figure 3B:
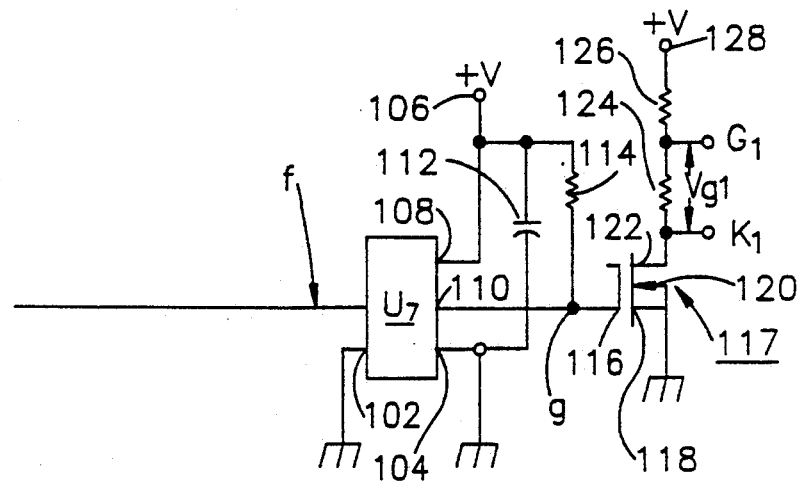
Figure 3B:
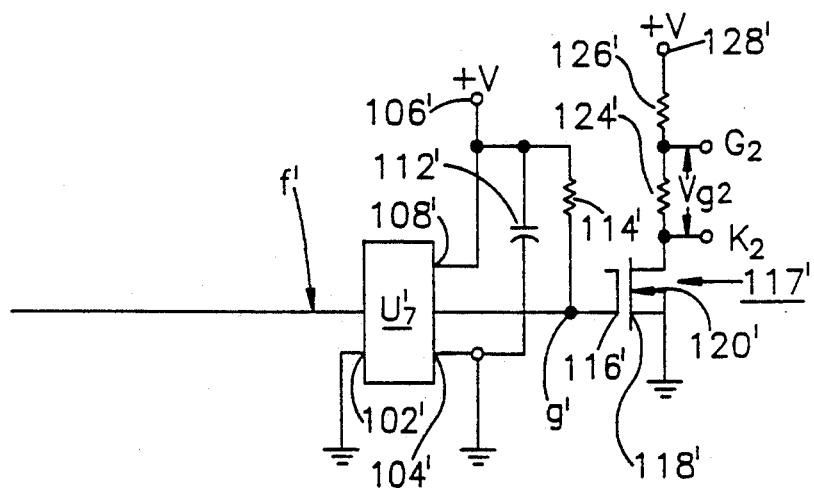

Reference is made to the schematic diagram of FIG. 3 for the control circuit 26 of FIG. 1 and to the voltage waveforms of FIGS. 4a through 4g, and FIGS. 5a through 5g, for a description of a way that the switching pulses $V_{g1}$ and $V_{g2}$ can be generated in accordance with this invention. The upper half of the circuit of FIG. 3 i.e. the portion above a ground line 50, generates the switching pulses $V_{g1}$, and the lower half of the circuit generates the switching pulses $V_{g2}$. Components in the lower half of the circuit that correspond to components in the upper half of the circuit have the same reference designations primed. In the circuit 26 of FIG. 3, the points "a" through "g" in the upper part thereof are where the waveforms of FIGS. 4a through 4g, respectively, appear; and the corresponding points a' through g' in the lower half of the circuit are where the waveforms of FIGS. 5a through 5g appear.

Note that waveforms 400 through 406, and 500 through 506, are associated with FIGS. 4a through 4g, and 5a through 5g, respectively.

Resistors 52 and 54 are connected in series between the input 27 and a source of reference potential (ground line 50, in this example), and the anode of a diode 56 is connected to their junction at 58. The cathode of diode 56 is connected to the negative input of a comparator $U_1$. The positive input of the comparator $U_1$ is connected to the ground line 50. Because of the rectification by the diode 56, the positive half cycles 400 (see FIG. 4a) of the sine wave voltage at the input 27 are applied to the negative input of the comparator $U_1$, and because of the action of the comparator $U_1$, the negative pulses 401 of FIG. 4b appear at its output.

The pulses 401 of FIG. 4b are amplified by an invertor $U_2$ that is coupled to the output of $U_1$ by a resistor 60. A slight delay is introduced by a resistor 62 and a capacitor 64 that are connected in series between the output of $U_2$ and the ground line 50. Inverting amplifiers $U_3$ and $U_4$ are connected in series between the junction of the resistor 62 and the capacitor 64, and the base electrode of transistor 65, for shaping the integrated pulses produced at the junction of resistor 62 and the capacitor 64.

The output of invertor $U_4$ is applied to a sawtooth generating means herein shown as being comprised of a transistor 65 having its base connected to the output of $U_4$, its collector connected to the ground line 50, and its emitter connected via a resistor 68 to a point 66 of positive voltage $+V$. A capacitor 70 that is connected between the emitter of transistor 65 and the ground line 50 is charged during the occurrence of positive pulses 72, 74 and 76 of the waveform 402, and discharged through the emitter-collector current path of transistor 65 when it is rendered conductive at the end of each of these pulses, so as to produce the sawtooth waveform 403 of FIG. 4d.

The sawtooth waves of waveform 403 are coupled from the emitter of transistor 65 to the positive input of a comparator $U_5$ via resistor 78. Also, a resistor 80 is connected between the positive input of comparator $U_5$ and ground line 50. A variable positive DC voltage is applied to the negative input of the comparator $U_5$ by any suitable means. In this particular circuit this is achieved by connecting a resistor 82 in series with a potentiometer 84 between a point 86 of positive voltage $+V$ and a source of reference potential, ground in this example. The arm 90 of the potentiometer 94 is connected to the ground line 50 via series resistors 92 and 94, and their junction 96 is connected to the negative input of the comparator $U_5$. A level of DC voltage 96' that may thus be supplied to the negative input of $U_5$ is shown in FIG. 4d. When the voltage of the sawtooth wave 403 is greater than the level of the DC voltage 96', the output of $U_5$ becomes positive as indicated by the positive pulses of waveform 404 of FIG. 4e. As the arm 90 of the potentiometer is moved, the voltage 96' moves up or down so as to change the position of the trailing edge of each pulse of waveform 404 as indicated by the double headed arrows 407. Thus the width of the pulses of waveform 404 is varied via potentiometer or variable resistor 84.

The polarity of the pulses of waveform 404 is inverted (see waveform 405 of FIG. 4f) by an invertor $U_6$ having its input connected via resistor 98 to the output of $U_5$. In order to isolate the low power control circuit from the high power circuitry of FIG. 1 which it controls, the pulses of waveform 405 are applied to an opto coupler $U_7$ (an HCPL-2602, for example) via resistor 100 connected from the input of $U_7$ to the output of $U_6$. The particular coupler $U_7$ shown requires that two pins 102 and 104 be at ground for the power circuits of FIG. 1 and that a positive voltage from a point 106 be supplied to pin 108, in this example. The pulses of waveform 405 appear at an output pin 110 of $U_7$, and a capacitor 112 and a resistor 114 are connected in parallel between the pin 110 and the point 106 of positive voltage.

The switching or trigger pulses $V_{g1}$ for controlling the conductivity of thyristor 12 are derived from the pulses of waveform 405 at the output pin 110 of $U_7$ as follows. A gate electrode 116 of a field-effect transistor 117 is connected to the output pin 110 of $U_7$ so as to receive the negative pulses of waveform 405. The transistor 117 also has its drain electrode 118 connected to ground for the circuit of FIG. 1, and its source electrode 122 connected via series resistors 124 and 126 to a point 128 of positive voltage +V. The cathode connection $K_1$ is 20 to the source electrode 122, and the gate connection $G_1$ is to the junction 130 of the resistors 124 and 126, for connection to thyristor 12 (see FIG. 1). The switching voltage or trigger pulses $V_{g1}$, which are shown in waveform 406 in FIG. 4g are produced across the resistor 124.

The portion of the circuit of FIG. 3 below the ground line 50 operates to develop the switching pulses $V_{g2}$ of FIG. 1 from the sine waves applied to its input 29 in the same way as just explained, with the exception that the waveforms 501 through 506 and the switching pulses $V_{g2}$ shown in FIGS. 5b–5g respectively are derived from the next half cycle of the input sinusoidal wave $V_i$.

Although various embodiments of the invention have been shown and described herein, they are not meant to be limiting. Those of skill in the art may recognize ways to modify these embodiments, which modifications are meant to be covered by the spirit and scope of the appended claims.

What is claimed is:

1. An ozonator power supply comprising:
   first and second input terminals adapted for coupling to a source of alternating current voltage;
   a transformer having primary and secondary windings;
   means for coupling one end of said primary winding to said first input terminal;
   first and second unidirectional switches coupled in anti-parallel relationship between the other end of said primary winding and said second input terminal, said switches being responsive to individual switching pulses, respectively, for turning on at different times;
   a switching pulse generator coupled to said first and second input terminals, for supplying said individual switching pulses to said first switch for biasing it into conduction during portions of half cycles of the alternating current voltage of one polarity, and for supplying said individual switching pulses to said second switch for biasing it into for conduction during portions of half cycles of the alternating current voltage of the opposite polarity;
   an inductor included in a circuit with one of said primary and secondary windings; and
   wherein an ozonator coupled to said secondary winding presents a capacitive load across aid secondary winding, and wherein said inductor has an inductance of such value that it resonates with said capacitive load at a frequency that is less than the frequency of said alternating voltage.

2. An ozonator power supply as set forth in claim 1 wherein said switching pulse generator has means for varying the duration of said individual switching pulses.

3. An ozonator power supply as set forth in claim 1 wherein said switching pulse generator has means for changing the duration of the switching pulses by varying the timing of their leading edges.

4. An ozonator power supply as set forth in claim 1, wherein said unidirectional switches are thyristors.

5. An ozonator power supply as set forth in claim 1 wherein said switching pulse generator comprises:
   means responsive to an alternating current voltage applied across said first and second input terminals for providing a first series of square voltage, and a second series of square waves during negative half cycles of the alternating voltage;
   means responsive to said first series of square waves for deriving a first series of sawtooth waves;
   means responsive to said second series of square waves for deriving a second series of sawtooth waves;
   means for providing a variable DC voltage;
   means responsive to said first series of sawtooth waves for providing a first series of switching pulses during the portions of the sawtooth waves of said first series of sawtooth waves having an amplitude exceeding said DC voltage, for application to said first switch; and
   means responsive to said second series of sawtooth waves for providing a second series of switching pulses during the portions of the sawtooth waves of said second series of sawtooth waves having an amplitude exceeding said DC voltage, for application to said second switch.

6. A method for generating a drive voltage for an ozonator having a capacitive impedance comprising:
   coupling a primary winding of a transformer to a voltage from an AC source via a circuit including two thyristors connected in antiparallel, the AC voltage having a given frequency:
   rendering the load seen by the AC source substantially resistive by inclusion of an inductance in circuit with said transformer;
   generating triggering pulses for one thyristor during positive half cycles of the A.C. voltage and triggering pulses for the other thyristor during negative half cycles of the AC voltage;
   deriving square waves of like polarity from positive and negative half cycles of an AC voltage;
   deriving sawtooth voltage waves from said respective square waves that increase in voltage during the occurrence of said square waves;
   supplying a variable DC voltage;
   producing switching pulses for one thyristor when square waves derived from positive half cycles of said AC voltage exceed said DC voltage; and
   producing switching pulses for the other thyristor when square waves derived from negative half cycles of said AC voltage exceed said DC voltage;
   whereby, the timing of the leading edges of said switching pulses changes as the value of said DC voltage is varied.

7. An ozonator power supply comprising:
   first and second input terminals adapted for coupling to a source of alternating current voltage;
   a transformer having primary and secondary windings;
   means for coupling one end of said primary winding to said first input terminal;
   first and second unidirectional switches coupled in anti-parallel relationship between the other end of said primary winding and said second input terminal, said switches being responsive to individual switching pulses, respectively, for turning on at different times;

a switching pulse generator coupled to said first and second input terminals, for supplying said individual switching pulses to said first switch for biasing it into conduction during portions of half cycles of the alternating current voltage of one polarity, and for supplying said individual switching pulses to said second switch for biasing it into for conduction during portions of half cycles of the alternating current voltage of the opposite polarity;

means responsive to an alternating current voltage applied across said first and second input terminals for providing a first series of square waves during positive half cycles of the alternating current voltage, and a second series of square waves during negative half cycles of the alternating voltage;

means responsive to said first series of square waves for deriving a first series of sawtooth waves;

means responsive to said second series of square waves for deriving a second series of sawtooth waves;

means for providing a variable DC voltage;

means responsive to said first series of sawtooth waves for providing a first series of switching pluses during the portions of the sawtooth waves of said first series of sawtooth waves having an amplitude exceeding said DC voltage, for application to said first switch; and means responsive to said second series of sawtooth waves for providing a second series of switching pulses during the portions of the sawtooth waves of said second series of sawtooth waves having an amplitude exceeding said DC voltage, for application to said second switch.

8. A control circuit for providing switching pulses for an ozonator power supply comprising:

means responsive to an alternating current voltage applied to first and second input terminals for providing a first series of square waves during positive half cycles of the alternating current voltage and a second series of square waves during negative half cycles of the alternating voltage;

means responsive to said first series for deriving a first series of sawtooth waves;

means responsive to said second series of square waves for deriving a second series of sawtooth waves;

means for providing a variable DC voltage;

means responsive to said first series of sawtooth waves for providing a first series of switching pulses during the portions of the sawtooth waves of said first series of sawtooth waves having an amplitude exceeding said DC voltage; and means responsive to said second series of sawtooth waves for providing a second series of switching pulses during the portions of the sawtooth waves of said second series of sawtooth waves having an amplitude exceeding said DC voltage.

9. A power supply for an ozonator having a capacitive impedance comprising:

a source of AC voltage having first and second terminals, the voltage having a given frequency and positive and negative half cycles;

a transformer having primary and secondary windings;

means for connecting one end of said primary winding to said first terminal;

means including first and second thyristors in antiparallel between the other end of said primary winding and said second terminal;

means for triggering said first thyristor at times within the positive half cycles of the AC voltage;

means for triggering said second thyristor at like times within the negative half cycles of the AC voltage; and an inductor included in circuit with one of said primary and secondary windings for resonating with the capacitance of said ozonator at a frequency that is less than the frequency of said AC voltage.

10. A power supply as set forth in claim 9, wherein said inductor is connected in circuit with said primary winding.

11. A power supply as set forth in claim 9, wherein said inductor is in circuit with said secondary winding.

12. A power supply for an ozonator as set forth in claim 9, wherein said means for triggering said thyristors comprises;

means for deriving first square waves during positive half cycles of the AC voltage;

means for deriving first sawtooth waves during the occurrence of said first square waves;

means for providing a DC voltage;

means for comparing said first sawtooth waves with said DC voltage, for producing triggering pulses for said first thyristor in response to the amplitude of said first sawtooth waves becoming greater than the amplitude of the DC voltage;

means for deriving second square waves during negative half cycles of the AC voltage;

means for deriving second sawtooth waves during the occurrence of said second square waves;

means for comparing said second sawtooth waves with said DC voltage and for producing triggering pulses for said second thyristor in response to the amplitude of said second sawtooth waves becoming greater than the amplitude of the DC voltage.

* * * * *